UNITED STATES PATENT OFFICE.

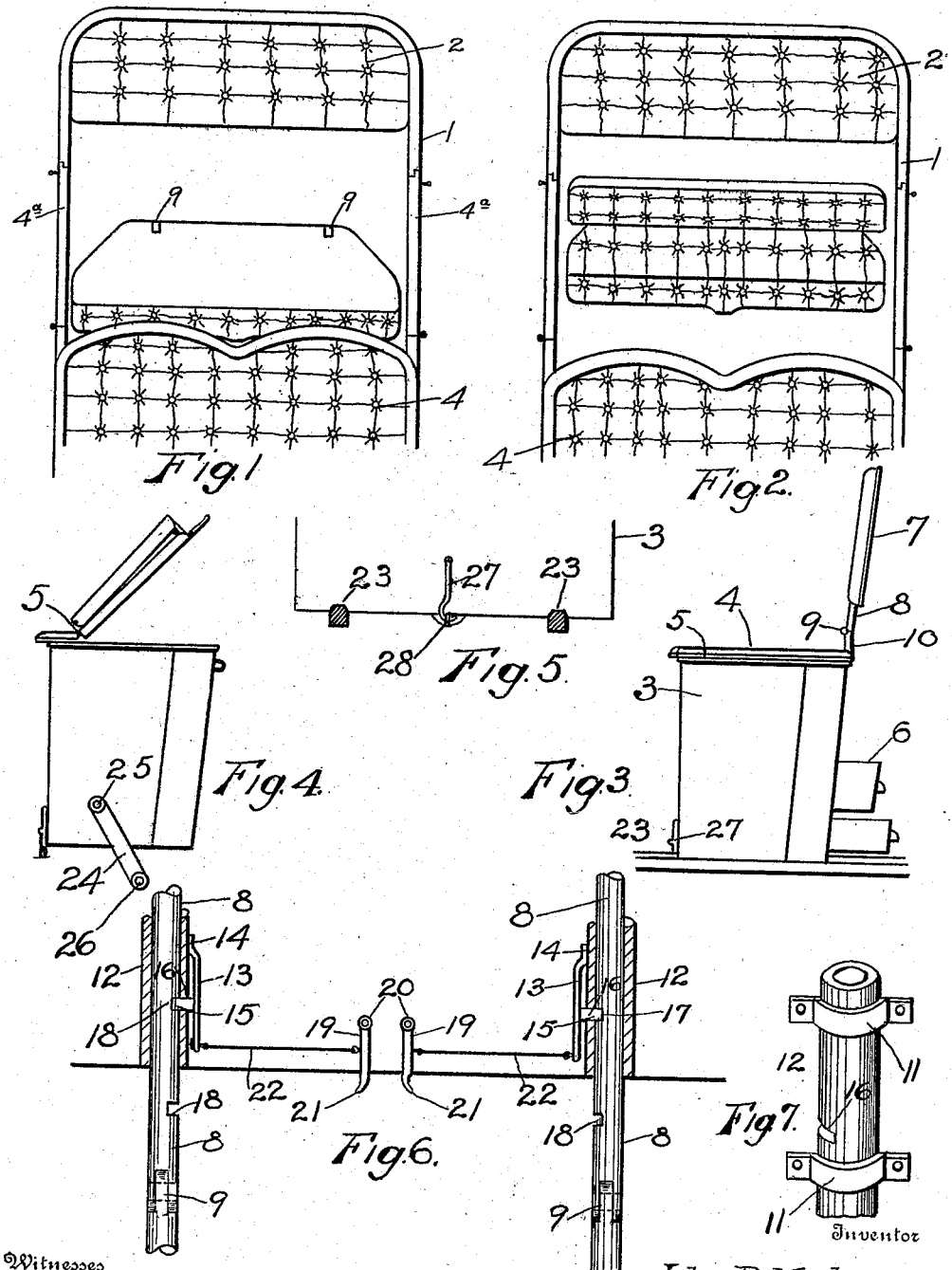

JOHN R. MALONEY, OF PROVIDENCE, RHODE ISLAND.

ADJUSTABLE FOLDING SEAT AND LUGGAGE-BOX.

No. 915,983.     Specification of Letters Patent.     Patented March 23, 1909.

Application filed July 12, 1907. Serial No. 383,475.

*To all whom it may concern:*

Be it known that I, JOHN R. MALONEY, a citizen of the United States, residing at the city of Providence, in the county of Providence and State of Rhode Island, have invented certain new and useful Improvements in Adjustable Folding Seats and Luggage-Boxes, of which the following is a specification, reference being had therein to the accompanying drawing.

This invention relates to the combination of an adjustable folding seat and luggage box and has for its object to provide a comfortable extra seat in the tonneau of an automobile which may be readily folded or reduced in size and moved out of the way when not in use.

A further object of the invention is to utilize the space which this seat takes up by forming under the same a convenient box or chest easy of access and in which luggage, or tools may be stored.

Extra seats in the tonneau of an automobile are constructed in various ways, but most of them are not comfortable to sit upon and none are provided with means for utilizing the space under the seats as is done in my construction.

The invention consists of other novel features and parts and combinations of the same as will be fully described hereinafter and then pointed out in the appended claim.

A practical embodiment of the invention is represented in the accompanying drawings forming a part of this specification, in which similar characters of reference indicate corresponding parts in all the views.

In the drawings: Figure 1— is a plan view showing a portion of the body of an automobile in outline, also showing the front seat and the back seat and the relative position of my auxiliary seat when folded and moved forward out of the way. Fig. 2— is a plan view similar to Fig. 1, showing the two fixed seats and the operative position of my auxiliary seat ready to be occupied by the passengers. Fig. 3— is a side elevation of the seat when in position shown in Fig. 2. Fig. 4— shows the seat with the back folded down and the cover of the luggage box raised. Fig. 5— is a front view of the luggage box seat showing the same mounted on guide rails and secured in position by a hook lock. Fig. 6— is an enlarged view illustrating the mechanism by which the back is retained in position on its guiding and supporting rods. Fig. 7— is a detail showing the tube in the back of the seat and the clips by which said tube is secured in position therein.

Referring to the drawings at 1 is represented the tonneau of the larger sized automobile which is designed with sufficient room to carry two or three extra passengers besides those who may comfortably occupy the rear seat 2. On account of the rough roads and rapid driving it is necessary that the passengers be provided with very comfortable seats or they soon become wearied and unable to enjoy the ride. Then again when the extra passengers do not go it is desirable to remove their unused seats, and it is also found to be convenient to have a place easy of access in which extra wraps, hats, gloves and the like may be stored. To fully meet these requirements I have constructed a box or chest 3 to fit into the waste space in the car and be moved closely up against the back of the forward seats 4 when not in use, this chest being just high enough to form a comfortabble seat, and is nicely upholstered on its top at 4. This top or seat is hinged at 5 so that the lid may be raised to get at the luggage, tools or the like stored in the same, or if desired a series of drawers 6 may be formed in this chest which may be easily opened from the rear seat to get at the contents of the chest without being obliged to disturb the occupants of the seat.

A large comfortable upholstered back 7 is adjustably mounted on rods 8—8 which are hinged at 9—9 to the up-turned members 10 on the rear edge of the seat 4. Within this upholstered portion are two tubular members 12—12 secured to the back of the seat by means of clips 11 through which tubes the rods 8—8 are adapted to slide. At 13—13 are two downwardly extending spring fingers secured to the tube at their upper ends 14 by rivets or other convenient means. A bolt 15 is fixed to each of these spring fingers and adapted to work through a slot 16 in the side of the tube and engage either one of the notches 17 or 18 in the rod 8 to retain the back in its extended or contracted position, or any number of notches may be used whereby the back may be adjusted to any desired height. In order to operate these lock bolts easily I have provided two short finger actuated levers 19—19 which are pivoted at 20 at their upper ends and provided with finger engaging lower ends 21—21. Each lever being connected to the lower end of its particular spring finger 13 by means of the cord 22.

In order that this seat may be readily moved forward out of the way and back again into its operative position I have provided a pair of ways or rails 23—23 which may be laid and secured in any convenient manner over the carpets or rugs, and on which the seat may be adapted to roll or slide. Another means by which the seat may be easily moved from its forward to its rear position is by hanging the same on a pair of swinging connections 24, in the manner illustrated in Fig. 4, one end of each connection being pivoted to the chest at 25 and its opposite end pivoted to the car body at 26.

When the seat is in its operative position, as shown in Fig. 3, the same is securely locked so as to prevent it from tipping back, a simple means of securing the same is that of a hook, 27, as illustrated in Fig. 5, but any other suitable means may be employed for this purpose.

The operation of my improved adjustable folding seat and luggage box may be more fully described as follows: When not in use the back of this seat is folded down in the position illustrated in Fig. 1 and the same is moved forward against the back of the front seats 4. The passengers for the rear seat enter the car through the door 4ª on either side of the car and when the required number have been seated the adjustable seat is drawn back into the position illustrated in Fig. 2, the back 7 is thrown upward into position, the finger levers 21 are pressed together and said back is extended to the required height to suit the convenience and comfort of the passengers. When the seat is in its operative position it is locked with the hook 27 and the passengers may then enter and occupy the same which is made as comfortable as any seat in the car. While *en route* if anything is required in the luggage box any of the sliding drawers may be withdrawn and the articles obtained, or the same may be made in the form of one large chest which is made accessible by raising the top or lid into the position best illustrated in Fig. 4.

The device has proved itself in practice to be very useful and convenient and adds greatly to the pleasure and comfort of the occupants of the car.

Having thus described my invention, what I claim as new and desire to secure by Letters Patent, is:

A seat of the character described comprising a luggage box adapted to fit in the tonneau of an automobile and provided with a seat portion, hinged rods carried by said box, a back provided with tubular members slidably mounted on said rods above the hinge connection of the latter, resilient arms secured to the exterior surfaces of said tubular members and provided with locking projections for engagement with said rods, means for simultaneously disengaging said locking projections, and means for adjustably supporting said box.

In testimony whereof I affix my signature in presence of two witnesses.

JOHN R. MALONEY.

Witnesses:
 HOWARD E. BARLOW,
 E. I. OGDEN.